(12) United States Patent
Noh et al.

(10) Patent No.: US 9,933,988 B2
(45) Date of Patent: Apr. 3, 2018

(54) DISPLAY APPARATUS AND METHOD OF CONTROLLING DISPLAY APPARATUS

(71) Applicant: Samsung Electronics Co., Ltd, Suwon-si, Gyeonggi-do (KR)

(72) Inventors: Dae-young Noh, Seoul (KR); Seung-pok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 14/260,489

(22) Filed: Apr. 24, 2014

(65) Prior Publication Data

US 2015/0113425 A1    Apr. 23, 2015

(30) Foreign Application Priority Data

Oct. 17, 2013 (KR) .................. 10-2013-0124009

(51) Int. Cl.
| | |
|---|---|
| *G06F 3/048* | (2013.01) |
| *G06F 3/14* | (2006.01) |
| *G09G 5/36* | (2006.01) |
| *G06F 1/16* | (2006.01) |
| *G06F 3/038* | (2013.01) |

(52) U.S. Cl.
CPC .......... *G06F 3/1454* (2013.01); *G06F 1/1643* (2013.01); *G06F 1/1654* (2013.01); *G06F 3/038* (2013.01); *G06F 3/14* (2013.01); *G06F 3/1423* (2013.01); *G09G 5/363* (2013.01); *G06F 2203/0384* (2013.01); *G09G 2354/00* (2013.01); *G09G 2370/12* (2013.01); *G09G 2370/16* (2013.01)

(58) Field of Classification Search
None
See application file for complete search history.

(56) References Cited

U.S. PATENT DOCUMENTS

| | | | | |
|---|---|---|---|---|
| 6,563,517 | B1 * | 5/2003 | Bhagwat | G06F 17/30905 375/E7.016 |
| 8,151,305 | B2 * | 4/2012 | Doerr | H04L 65/607 725/133 |
| 8,989,375 | B2 * | 3/2015 | Kanda | H04N 21/4122 345/156 |
| 2003/0198008 | A1 | 10/2003 | Leapman et al. | |

(Continued)

FOREIGN PATENT DOCUMENTS

| | | |
|---|---|---|
| KR | 10-2008-0009063 | 1/2008 |
| KR | 10-2009-0095002 | 9/2009 |

(Continued)

OTHER PUBLICATIONS

International Search Report and Written Opinion of the International Searching Authority dated Nov. 28, 2014 in International Patent Application PCT/KR2014/006639.

*Primary Examiner* — Hua Lu
(74) *Attorney, Agent, or Firm* — Staas & Halsey LLP

(57) ABSTRACT

A display apparatus includes a communication interface configured to wirelessly receive first image data from a host apparatus, a user interface configured to display the received first image data, and a controller configured to control the user interface to generate second image data by operations of an operating system of the display apparatus, and display at least one of the generated second image data and the received first image data.

16 Claims, 12 Drawing Sheets

(56) References Cited

U.S. PATENT DOCUMENTS

| | | | |
|---|---|---|---|
| 2006/0209892 A1 | 9/2006 | MacMullan et al. | |
| 2007/0064113 A1 | 3/2007 | Lee | |
| 2007/0067734 A1* | 3/2007 | Cunningham | G06F 3/04817 715/779 |
| 2007/0263086 A1* | 11/2007 | Murai | G06F 3/14 348/14.13 |
| 2009/0298435 A1* | 12/2009 | Lee | H04W 72/082 455/63.1 |
| 2011/0010607 A1 | 1/2011 | Raveendran | |
| 2011/0090405 A1* | 4/2011 | Hiroki | G03B 21/14 348/705 |
| 2011/0197233 A1* | 8/2011 | Paik | H04H 20/24 725/62 |
| 2012/0016933 A1* | 1/2012 | Day | H04L 63/102 709/203 |
| 2012/0042252 A1* | 2/2012 | Neerudu | G06F 9/4445 715/733 |
| 2012/0050183 A1* | 3/2012 | Lee | G06F 3/1423 345/173 |
| 2012/0072620 A1* | 3/2012 | Jeong | G06F 1/1654 710/29 |
| 2012/0329527 A1* | 12/2012 | Kang | H04N 13/0059 455/566 |
| 2013/0057908 A1* | 3/2013 | Park | H04L 61/2015 358/1.15 |
| 2013/0162502 A1* | 6/2013 | Lee | G09G 5/003 345/1.2 |
| 2013/0167040 A1* | 6/2013 | Lee | G06F 3/04842 715/748 |
| 2013/0332856 A1* | 12/2013 | Sanders | G06F 3/0481 715/753 |
| 2014/0028916 A1* | 1/2014 | Toyoda | H04N 21/4307 348/547 |

FOREIGN PATENT DOCUMENTS

| | | |
|---|---|---|
| KR | 10-2012-0052975 | 5/2012 |
| KR | 10-2012-0069594 | 6/2012 |
| KR | 10-1173262 | 8/2012 |

* cited by examiner

DISPLAY APPARATUS AND METHOD OF CONTROLLING DISPLAY APPARATUS

CROSS-REFERENCE TO RELATED APPLICATIONS

This application claims priority from Korean Patent Application No. 10-2013-0124009 filed on Oct. 17, 2013 in the Korean Intellectual Property Office, the disclosure of which is incorporated herein by reference in its entirety.

BACKGROUND OF THE INVENTION

1. Field of the Invention

Exemplary embodiments described herein relate to a display apparatus and a method of controlling a display apparatus, and more particularly, to a display apparatus capable of displaying an image data generated by the display apparatus, when a wireless connection state with a host apparatus is not sufficient, and a method of controlling thereof.

2. Description of the Related Art

Recently, a wireless connection between a calculating apparatus and an apparatus which displays a calculation result (together referred to as an electronic apparatus) has improved in portability of an electronic apparatus. To be specific, at a host apparatus, computed data such as image processed data is transmitted to a display apparatus by using wireless technology, and the received data is displayed on the display apparatus. Hereinbelow, such an apparatus is referred to as a wireless detachable apparatus.

Such a wireless detachable apparatus can be freely utilized by placing a host apparatus thereof at a fixed location and with only a display apparatus thereof movable within a scope where wireless communication therebetween is available. In this case, the detachable apparatus (host and display combination) has good portability and enables a user to have differentiated experiences.

However, the conventional wireless detachable apparatus has a drawback in that when a connection with the host apparatus, which provides image data, is disconnected, the display apparatus cannot be used.

Specifically, the host apparatus and the display apparatus are connected by using a wireless communication method, and this method enables connection with a high degree of freedom as compared to a wired communication method. However, there are limitations in terms of distance, since a wireless communication method is used. Therefore, when the display apparatus is outside of an area (out of a wireless range) where the host apparatus is located, a user cannot use the display apparatus.

SUMMARY OF THE INVENTION

Exemplary embodiments of the present inventive concept as described herein are designed in accordance with the above-described necessities, and provide a display apparatus which is capable of displaying image data generated by the display apparatus, when a wireless connection state with a host apparatus is not sufficient, and a method of controlling the same.

Additional features and utilities of the present general inventive concept will be set forth in part in the description which follows and, in part, will be obvious from the description, or may be learned by practice of the general inventive concept.

Exemplary embodiments of the present inventive concept provide a display apparatus wirelessly connectable with a host apparatus, the display apparatus including a communication interface configured to wirelessly receive first image data from the host apparatus, a user interface configured to display the received first image data, and a controller configured to control the user interface to generate second image data by operations of an operating system of the display apparatus, and display at least one of the generated second image data and the received first data.

The communication interface may detect a state of a wireless connection with the host apparatus, wherein the controller, according to a state of the wireless connection with the host apparatus, controls the user interface to display at least one of the generated second image data and the received first image data.

In an exemplary embodiment, while the received first image data is being displayed, when a state of the wireless connection with the host apparatus is in a preset first state, the controller may control the user interface to display the generated second image data, and while the second image data is being displayed, when a state of wireless connection with the host apparatus is in a preset second state, the controller may control the user interface to display the received first image data.

In an exemplary embodiment, when a wireless connection state with the detected host apparatus is a state where image data to be displayed on the user interface is to be changed, the user interface may receive a selection of image data to be displayed on the user interface by a user.

In an exemplary embodiment, when a wireless connection state with the detected host apparatus is a preset second state, the controller may control the user interface to display the received first image data and the generated second image data together.

In an exemplary embodiment, according to a user choice through the user interface, the controller may control the user interface to display the generated second image data or the received first image data.

In an exemplary embodiment, when the display apparatus displays the generated second image data, the controller may control the communication interface to connect the second image data with an internet network using the wireless communication method.

In an exemplary embodiment, the communication interface may receive the first image data and voice data corresponding to the first image data, and the user interface may output the voice data at the same time as the displaying of the first image data.

In an exemplary embodiment, the received first image data is an encoded image data, wherein the display apparatus may further include a decoder which performs hardware decoding of the received encoded first image data, and the user interface may display the hardware-decoded first image data.

The wireless communication method may be 802.11n or 802.11ac which uses a 5 Ghz band.

Exemplary embodiments of the present inventive concept also provide a method of controlling a display apparatus wirelessly connectable with a host apparatus, wherein the method includes the display apparatus wirelessly receiving first image data from the host apparatus; generating second image data by operations of an operating system of the display apparatus; and displaying at least one of the generated second image data and the received first image data.

In an exemplary embodiment, the method may further include the display apparatus detecting a state of a wireless connection with the host apparatus; wherein the displaying may include displaying at least one of the generated second image data and the received first image data, according to a state of wireless connection with the detected host apparatus.

In an exemplary embodiment, while the received first image data is being displayed, when a state of wireless connection with the host apparatus is in a preset first state, the display apparatus displays the generated second image data, and while the second image data is being displayed, when a state of a wireless connection with the host apparatus is in a preset second state, the display apparatus displays the received first image data.

In an exemplary embodiment, the method may further include, when a wireless connection state with the detected host apparatus is a state where image data to be displayed on the user interface is to be changed, the display apparatus receives a selection of image data to be displayed on the user interface by a user.

In an exemplary embodiment, the displaying may include, when a wireless connection state with the detected host apparatus is a preset second state, displaying the received first image data and the generated second image data together.

In an exemplary embodiment, the method may further include receiving a selection of image data to be displayed on the user interface of the display apparatus; wherein the displaying comprises displaying the generated second image data or the received first image data, according to the user choice.

In an exemplary embodiment, the method may further include, when the display apparatus displays the generated second image data, connecting the second image data with an internet network using the wireless communication method.

In an exemplary embodiment, the receiving may include receiving the first image data and voice data corresponding to the first image data, wherein the displaying comprises outputting the voice data at the same time as the displaying of the received first image data.

In an exemplary embodiment, the received first image data may be encoded image data, and the control method may further include hardware decoding of the received first image data; and the displaying may include displaying the hardware decoded first image data.

The wireless communication method may be 802.11n or 802.11ac which uses a 5 Ghz band.

Exemplary embodiments of the present inventive concept also provide a computer-readable recording medium including a program to execute a control method of a display apparatus wirelessly connectable with a host apparatus, wherein the control method includes receiving first image data from the host apparatus using a wireless communication method, generating second image data by operations of an operating system of the display apparatus; and displaying at least one of the generated second image data and the received first data.

Exemplary embodiments of the present inventive concept also provide a display apparatus wirelessly connectable with a host apparatus, the display apparatus comprising: a user interface configured to display image data; and a controller configured to control the user interface to either display first image data wirelessly received from the host apparatus or to generate second image data by operations of an operating system of the display apparatus and display the generated second image data according to a state of a wireless connection with the host apparatus.

In an exemplary embodiment, while the received first image data is being displayed, when a state of the wireless connection with the host apparatus is in a preset first state, the controller controls the user interface to display the generated second image data, and while the generated second image data is being displayed, when a state of the wireless connection with the host apparatus is in a preset second state, the controller controls the user interface to display the received first image data.

In an exemplary embodiment, when a wireless connection state with the host apparatus is in a state where image data to be displayed on the user interface is to be changed, the user interface is configured to receive a selection of image data to be displayed by a user.

In an exemplary embodiment, when a wireless connection state with the host apparatus is a preset third state, the controller controls the user interface to display the received first image data and the generated second image data together.

In an exemplary embodiment, the display apparatus further comprises a decoder which performs hardware decoding of the received first image data, and the user interface displays the hardware-decoded first image data.

Exemplary embodiments of the present inventive concept also provide an electronic device, comprising: a host apparatus to encode image data and wirelessly transmit the encoded image data; and a display apparatus detachably connectable to the host apparatus, the display apparatus comprising: a communication interface configured to wirelessly receive encoded first image data from the host apparatus and to detect a state of a wireless connection with the host apparatus; a decoder to decode the received encoded first image data; a user interface configured to display image data; and a controller configured to control the user interface to generate second image data by operations of an operating system of the display apparatus and display at least one of the generated second image data and the decoded first image data.

In an exemplary embodiment, the controller controls the user interface to display at least one of the generated second image data and the received first image data according to the detected state of the wireless connection with the host apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
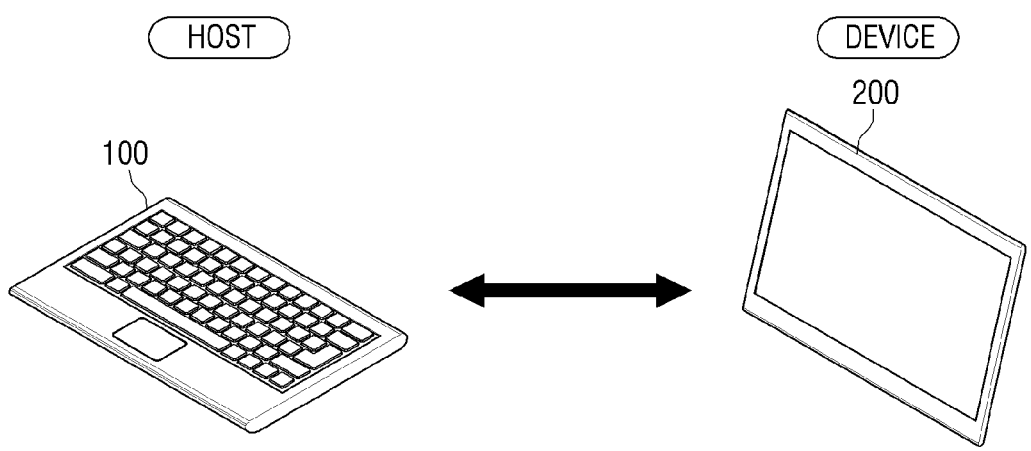
FIG. 1 is a block diagram illustrating the configurations of an electronic system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating the configurations of an electronic system according to an exemplary embodiment.

According to FIG. 1, an electronic system 1000 (or a detachable system) comprises a host apparatus 100 and a display apparatus 200.

The host apparatus 100 generates image data to be displayed on the display apparatus 200, performs an encoding of the generated image data, and transmits the encoded image data to the display apparatus 200 by using a wireless communication method. In addition, the host apparatus 100 can receive control information received by the display apparatus 200 and photographing data photographed through a photographing unit, such as a web cam, provided on the display apparatus 200. Detailed operations and configurations of the host apparatus 100 will be described below with reference to FIG. 2.

The display apparatus 200 can receive and display image data transmitted from the host apparatus 100 by using a wireless method. To be specific, the display apparatus 200 may receive encoded image data from the host apparatus by using a wireless communication method, decode the received encoded image data, and display the decoded image data. In addition, the display apparatus 200 may transmit a control command input from components of the display apparatus, such as a touch screen and an input to photograph data through a photographing unit, such as a web cam, to the host apparatus 100.

In addition, the display apparatus 200 generates image data by the operations of an operating system therein, and displays the generated image data. Specifically, the display apparatus 200 may generate image data by using its own operating system, and display the generated image data. Detailed operations and configurations of the display apparatus 200 will be described below with reference to FIG. 3.

As described above, the electronic system 1000 according to this exemplary embodiment can be operated by using an operating system provided in the display apparatus 200, even when wireless connection between the display apparatus 200 and the host apparatus 100 becomes weak or the connection is disconnected, and thus, the degree and scope of utilization of the display apparatus 200 is improved.

Meanwhile, in explaining FIG. 1, although it is illustrated that the display apparatus 200 is connected to one host apparatus 100, during implementation of the inventive concept herein, the display apparatus 200 can alternatively be selectively connected to a plurality of host apparatuses. In addition, the host apparatus 100 can similarly be connected to a plurality of display apparatuses. That is, the host apparatus and the display apparatus can be connected in various ratio arrangements, such as a 1:1, 1:n, n:1, n:n, ratio, or the like.

Meanwhile, in describing FIG. 1, although it has been explained that the host apparatus 100 directly generates image data, during implementation, the host apparatus can also be configured to receive image data by wire and deliver the received image data to the display apparatus by using a wireless communication method, that is, the dongle type. In addition, in explaining FIG. 1, although it has been explained that the display apparatus 200 directly displays image data, during implementation, the display apparatus can be configured to process image data which is transmitted wirelessly and deliver the received image data to an external apparatus by wire, that is, the dongle type.

Figure 2:
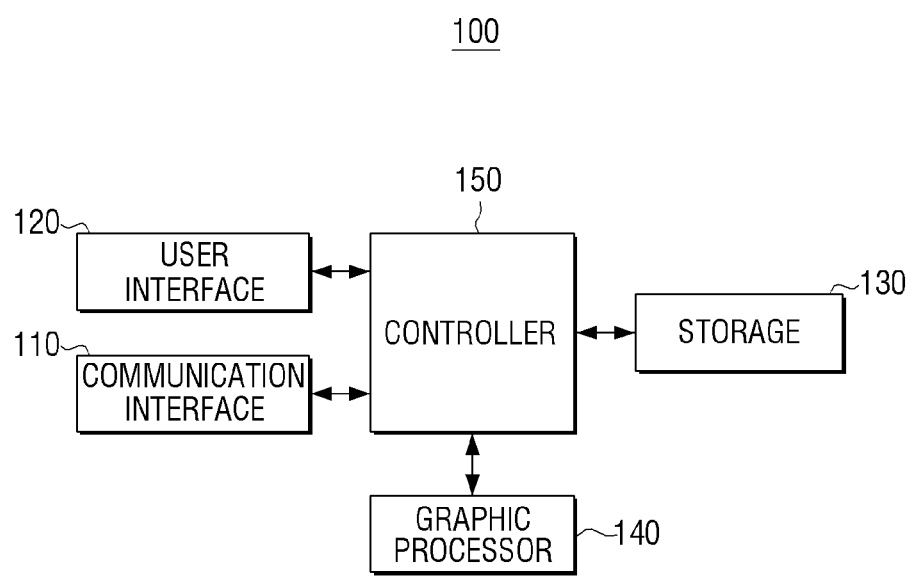
FIG. 2 is a block diagram illustrating the configurations of a host apparatus of FIG. 1.

FIG. 2 is a block diagram illustrating the configurations of a host apparatus of FIG. 1.

Referring to FIG. 2, the host apparatus 100 may include a communication interface 110, a user interface 120, a storage 130, a graphic processor 140, and a controller 150. This host apparatus 100 can be a conventional desk-top type host, a notebook PC, a smartphone, an MP3, a PMP, or the like, and can be a 'dongle' type, which is connected and operated in connection with the aforementioned apparatuses.

The host apparatus 100 has a plurality of the operation modes. Herein, the plurality of the operation modes may include a normal mode in which all the components (portions) of the host apparatus 100 operate, and a power saving mode which requires lower power consumption than the normal mode. Meanwhile, in this exemplary embodiment, although it has been explained that the host apparatus 100 has one power saving mode, during implementation, the host apparatus 100 may include a plurality of power saving modes.

The communication interface 110 is configured to connect the electronic system 1000 to an external apparatus (not illustrated), and can be connected to an external apparatus through a LAN (Local Area Network), an internet network, or a wireless communication method (for example, wireless communication including GSM, UMTS, LTE, WiBRO, Wi-Fi, Bluetooth, etc.). Herein, it is desirable that the phrase "wireless communication" refers to a separate wireless communication for communicating with the display apparatus 200, which will be described later.

The communication interface 110 transmits image data by using a wireless communication method which uses a preset band. To be specific, the communication interface 110 may transmit image data, which is encoded by using 802.11n (bandwidth 300 Mbps), which has a 5 GHz band having enough distance to be usable in a user's home, or 802.11ac (bandwidth 1 Gbs), to the display apparatus 200. In this case, the communication interface 110 may transmit to the display apparatus 200 voice data along with the image data. Meanwhile, in an exemplary embodiment, although using Wi-Fi (Wireless LAN) has been described, during implementation, using another type of wireless communication which can use the aforementioned band is also available in addition to the Wi-Fi method. Moreover, in an exemplary embodiment, although using a 5 Ghz band has been explained, another band near the 5 Ghz band can also be used. Meanwhile, in an exemplary embodiment, although it has been illustrated that the communication interface 110 transmits one image data to one display apparatus 200, the communication interface 110 may also transmit one image data to a plurality of the display apparatuses 200, or a plurality of different image data to each of the plurality of display apparatuses 200.

In addition, the communication interface 110 receives a control command from the display apparatus 200. To be specific, the communication interface 110, by using the aforementioned wireless communication method, may receive a user control command input received at the display apparatus 200.

The communication interface 110 may transceive control data with the display apparatus 200. Herein, the control data is data, excluding the image data and the voice data, which is transmitted both ways between the host apparatus 100 and the display apparatus 200, and may include a user control command received from a user at the display apparatus 200 or the host apparatus 100, an apparatus control command corresponding to the received control command, information regarding a state of the host apparatus 100, and information regarding a state of the display apparatus 200, or the like. Herein, the state information of an apparatus may be information regarding an operation mode of a host apparatus and a display apparatus, a power state of a display apparatus (specifically, information regarding the remaining battery charge level), a display mode of a display apparatus, or the like. Meanwhile, in this exemplary embodiment, although it has been described that control data is transmitted by using a wireless communication method which transmits image data, during implementation, another communication method (for example, Bluetooth, RF communication, IR communication, etc.) other than the wireless communication method which transmits image data may be used when transceiving control data.

In addition, the communication interface 110 can receive photographing data from the display apparatus 200. Specifically, the communication interface 110 may receive photographing data photographed at a photographing unit of the display apparatus 200 by using the wireless communication method described above. Herein, the photographing data may be image data such as JPEG and BMP, or visual data such as MP4 and AVI. Meanwhile, in an exemplary embodiment, although it has been explained that photographing data including image data only is received, the photographing data to be received may also include voice data. Meanwhile, in an exemplary embodiment, although it has been described that photographing data is transmitted by using a wireless communication method which transmits image data, during implementation, photographing data may be received through a communication method (for example, Bluetooth, RF communication, IR communication, etc.) other than the wireless communication method which transmits image data, as described above.

The user interface 120 may have a plurality of function keys which enable a user to set or select various functions supported by the host apparatus 100, and display various information provided by the host apparatus 100. The user interface 120 may be implemented as a touch screen which implements input and output at the same time, or a combination of an input apparatus including a mouse and/or a keyboard and a display apparatus which displays an image. In this case, the user interface 120 may include a keyboard, and can receive a user control command from a user through the keyboard.

Meanwhile, although it has been illustrated and explained that the electronic system 1000 displays an image at the display apparatus 200, during implementation, the host apparatus 100 may further have a configuration which displays an image which is the same or different from an image displayed at the display apparatus 200.

The storage 130 stores a program to drive the host apparatus 100. Specifically, the storage 130 may store a program which is a group of various commands required when driving the host apparatus 100. Herein, the program includes not only an application program to provide a specific service, but also an operating program to drive the application program.

In addition, the storage 130 may store a photographing data transmitted from the display apparatus 200.

Such storage 130 may be implemented as a storage medium within or external to the host apparatus 100, for example, a removable disk including a USB memory, a web server through a network, or the like.

The graphic processor 140 generates image data to be displayed at the display apparatus 200. To be specific, the graphic processor 140 may generate image data corresponding to a user control command received through the display apparatus 200 (or a user control command received through the user interface 120). Herein, the generated image data may be real-time streaming data.

Meanwhile, in this exemplary embodiment, although it has been explained that the graphic processor 140 generates only image data, during implemenation, the graphic processor 140 may also generate voice data, and visual streaming data having both image data and voice data. Such visual streaming data may be data of an HDMI (High-Definition Multimedia Interface) format.

In addition, the graphic processor 140 generates image data including the received photographing data. Specifically, the graphic processor 140 may generate image data including the photographing data received through the communication interface 110. In this case, the graphic processor 140 may use the received photographing data as it is, or may adjust a size and/or a ratio of the received photographing data for use. In other words, the graphic processor 140 may perform an image processing on the received photographing data, and by using the image processed photographing data, may generate image data to be displayed at the display apparatus 200.

Moreover, the graphic processor 140 can perform hardware encoding of the generated image data. To be specific, the graphic processor 140 may encode the output image data independently without a control by the controller 150 (specifically, CPU), which will be described later. Herein, for encoding, the standard H.264 method of encoding can be used, or other than the H.264 method, another encoding method which may handle image quality degradation or may be processed with enough bandwidth may be used. As such, the graphic processor 140 may perform encoding independently on image data without involvement of the controller 150, and thus latency of the transmitted image data is close to 0. In addition, the image data is encoded (specifically, compressed) and transmitted, and thus a high resolution image may be transmitted by using Wi-Fi which has a relatively smaller bandwidth.

In addition, the graphic processor 140 may perform hardware encoding of voice data. Meanwhile, in this exemplary embodiment, although it has been described that the graphic processor 140 individually encodes image data and voice data, during implementation, when data output at the graphic processor 140 is data such as HDMI type data, which includes both voice and an image data components, both image and voice data can be hardware encoded at the same time. In this case, the graphic processor 140 may perform encoding and discretization of data input to HDMI in accordance with a bandwidth, and proceed with compression.

Meanwhile, in an exemplary embodiment, although it has been explained that the graphic processor 140 generates image data and performs encoding of the generated image data, during implementation, an encoding operation of image data may be performed at a separate apparatus by using a separate encoder. In addition, in an exemplary embodiment, although it has been explained that hardware encoding is used as an encoding method, if performance of a CPU is sufficient, encoding may be also implemented by using a software encoding method.

The controller 150 performs control on each component of the host apparatus 100. To be specific, the controller 150 decides an operation mode of the host apparatus 100. More specifically, when there is no user input for a preset period of time, and when an operation is not performed for a preset period of time, the controller 150 may determine an operation mode of the host apparatus 100 as a power saving mode. In addition, when information notifying a user that an operation mode of the display apparatus 200 is changed to a power saving mode or a display mode is changed to a second display mode (an operation mode with a display apparatus' own OS) is received through the communication interface 110, the controller 150 can determine an operation mode of the host apparatus 100 as a power saving mode.

Meanwhile, in a power saving mode, when a wake-up command is received from a user through the user interface 120, or when information notifying a user that an operation mode of the display apparatus 200 is changed from a power saving mode to a normal mode is received through the communication interface 110, the controller 150 may determine an operation mode of the host apparatus 100 as a normal mode. Meanwhile, in the above described embodiment, although it has been explained that an operation mode of the host apparatus 100 is changed from a power saving mode to a normal mode, or a normal mode to a power saving mode, it can be applied in the same manner for the case where an operation mode is changed by power-on of a user from a power-off mode to a normal mode.

In addition, the controller 150 may determine an operation mode of the host apparatus 100 according to a display mode of the display apparatus 200. To be specific, when information on a display mode of the display apparatus 200 is received through the communication interface 110 as state (i.e.: operation mode) information, and a second display mode which only displays second image data generated by the display apparatus 200 is operated, it is not required to provide the display apparatus 200 with image data, and therefore, the controller 150 may determine an operation mode of the host apparatus 100 as a power saving mode. Meanwhile, in this exemplary embodiment, although it has been explained that information on a display mode is received as state information and an operation mode of the host apparatus 100 is determined, during implementation, an operation mode of the host apparatus 100 may be determined in accordance with a wireless connection with the display apparatus 200.

Also, the controller 150 may determine an operation mode of the host apparatus 100 according to a state of a battery (i.e.: charge level) of the display apparatus 200. To be specific, when information on a remaining battery charge level of the display apparatus 200 is received as state information from the communication interface 110, and received remaining battery charge level is less than a preset remaining battery charge level, the controller 150 may determine an operation mode of the host apparatus 100 as a power saving mode. By this determination, when an operation mode of the host apparatus 100 is changed to a power saving mode, and after the change, the state of the battery of the display apparatus 200 is changed to a charging state, the controller 150 may determine an operation mode of the host apparatus 100 as a normal mode once again. Such information that the state of the battery of the display apparatus 200 is changed to a charging state may be received as the aforementioned state information.

In addition, the controller 150 may control each component of the host apparatus 100 to correspond with the determined operation mode. To be specific, when an operation mode of the host apparatus 100 is changed to a power saving mode, the controller 150 may control that only a predetermined component(s) is operated, and that the storage 130 and the graphic processor 140, for example, are not to be operated.

For example, when a user inputs a power-off command through the user interface 120, or inputs a command to enter into a power saving mode, the controller 150 may control that each component of the host apparatus 100 may have a power state corresponding to a power saving mode (or a power-off mode). In addition, the controller 150 may control the communication interface 110 to notify a user that an operation mode of the host apparatus 100 is changed. When such information is transmitted to the display apparatus 200, an operation mode of the display apparatus 200 may be changed to a power saving mode or a power-off mode. As described above, the host apparatus 100 according to this exemplary embodiment delivers information as to whether an operation mode of the host apparatus 100 is changed to the display apparatus 200 as state information, and therefore, a user may change a state of the host apparatus 100 and the display apparatus 200 with only manipulation of one of the two apparatuses.

When an operation mode of the host apparatus 100 is changed to a normal mode, the controller 150 may control each component of the host apparatus 100 so that the components thereof which are not operated during a power saving mode can be woken up.

In addition, when an operation mode of the host apparatus 100 is changed, the controller 150 may control the communication interface 110 so that the changed operation mode of the host apparatus 100 is transmitted to the display apparatus 200 as state (i.e.: operation mode) information.

For example, when the host apparatus 100 is in a power saving mode or a power-off mode, if a wake-up command is received from a user through the user interface 120, the controller 150 may control the host apparatus 100 to wake up, and an operation mode of the host apparatus 100 is changed to a normal mode. That is, the controller 150 may control the host apparatus 100 to be booted. When an operation system stored in the storage 130 by the aforementioned process is loaded on a volatile memory and booted, the graphic processor 140 may be controlled so that image data obtained by the booting process, and image data corresponding to a user interface window supported by the operating system can be generated, and the communication interface 110 can be controlled to transmit the generated image data to the display apparatus 200 by using a wireless communication method.

At the same time, the controller 150 notifies to the display apparatus 200 through the communication interface 110 that the operation mode of the host apparatus 100 is changed, and therefore, the display apparatus 200 is also woken up without a separate manipulation by a user.

In addition, when the controller 150 receives a user control command through the user interface 120 (specifically, a keyboard), the controller 150 may control the graphic processor 140 to generate image data corresponding to the received first control command. The controller 150 may control the communication interface 110 so that the generated image data (specifically, encoded image data) can be transmitted to the display apparatus 200.

Meanwhile, when a user control command received through the user interface 120 is a second control command (for example, a command to change an operation such as a power-off command and a power-on command) to control an operation of the display apparatus 200, the controller 150 may control the communication interface 110 so that control data corresponding to the received second user control command is transmitted to the display apparatus 200.

In addition, when a user inputs a control command through the user interface 230 (specifically, a touch screen) provided on the display apparatus 200, the display apparatus 200 transmits to the host apparatus 100 the received control command as control data. Accordingly, the controller 150, when receiving control data from the display apparatus 200 corresponding to a user control command through the communication interface 110, may control the graphic processor 140 to generate image data corresponding to the received user control command.

For example, when a command to reproduce a movie file stored in the host apparatus 100 is received through the user interface 120, the controller 150 may control the graphic processor 140 and the communication interface 110 so that image data of the movie file stored in the storage 130 may be generated by a streaming method and transmitted to the display apparatus 200. Through this process, while streaming image data corresponding to a movie file is displayed on the display apparatus 200, when a command to stop an image is input through a touch screen provided on the display apparatus 200, the display apparatus 200 transmits this command to stop the image to the host apparatus 100 as control data. In this case, the host apparatus 100 may control the graphic processor 140 and the communication interface 110 so that the stopped image according to the received command to stop the image is displayed on the display apparatus 200.

Meanwhile, in the aforementioned exemplary embodiments, although it has been described that a streaming image corresponds to one content (or a resultant object of driving of one program), a streaming image may be a resultant object according to a plurality of contents. To be specific, a user may drive a plurality of application programs installed in the operating system of the host apparatus 100 at the same time. For example, when a user, while executing a first application program to surf the internet, additionally executes a second application program to reproduce music content (this type of command may be input through a touch screen of the user interface 230 of the display apparatus 200 or a keyboard or a mouse of the host apparatus 100), the controller 150 may concurrently drive the second application program while simultaneously driving the first application program. Accordingly, the controller 150 may generate a user interface window (that is, image data) to surf the internet in accordance with the result of driving the first application program and generate sound data according to the result of driving the second application program, and control the graphic processor 140 to generate real-time streaming data having the generated image data and sound data. In addition, the controller 150 may control the communication interface 110 so that the generated real-time streaming data is delivered to the display apparatus 200 by using a wireless communication method.

As described above, the host apparatus 100 according to this exemplary embodiment encodes image data and transmits the encoded image data to the display apparatus 200, and thus may transmit image data even with a low wireless resource, and may also receive data using the same wireless communication method, the received data including image data being photographed at the display apparatus 200 and various control data.

Meanwhile, in the described example, although it has been illustrated that the graphic unit 140 and the controller 150 are separate components, during implementation, the graphic unit 140 and controller 150 may be implemented as one combined component.

Figure 3:
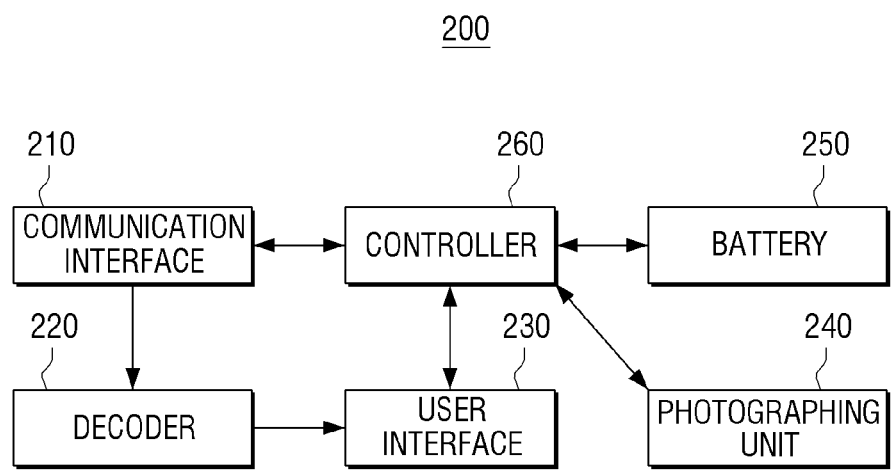
FIG. 3 is a block diagram illustrating the configurations of the display apparatus.

FIG. 3 is a block diagram illustrating the configurations of the display apparatus of FIG. 1

Referring to FIG. 3, the display apparatus 200 may include the communication interface 210, the decoder 220, the user interface 230, the photographing unit 240, the battery 250, and the controller 260.

The display apparatus 200 has a plurality of operation modes. Herein, the plurality of operation modes include a normal mode where all the components of the display apparatus 200 are operated according to a power state, and a power saving mode which operates with power lower than the normal mode. Meanwhile, in an exemplary embodiment, although it has been described that the display apparatus 200 has only one power saving mode, during implementation, the display apparatus 200 may include a plurality of power saving modes as an operation mode.

In addition, the display apparatus 200 has a plurality of display modes. Herein, the plurality of display modes, according to an image source displayed at the display apparatus 200, include a first display mode which displays an image delivered from the host apparatus 100, a second display mode which displays an image generated by the display apparatus 200, and a third display mode which displays an image delivered by the host apparatus 100 and an image generated by the display apparatus 200 together.

To be specific, the communication interface 210 may receive the first image data which is transmitted by using 802.11n (bandwidth 300 Mbps) which has a 5 GHz band having enough distance to be usable in a user's home or 802.11ac (bandwidth 1 Gbs) through the communication interface 110 of the host apparatus 100. In this case, the communication interface 110 may transmit to the display apparatus 200 voice data along with the image data. In this case, the received data at the display apparatus 200 may be real-time streaming data of an HDMI interface method. Meanwhile, in this exemplary embodiment, although using Wi-Fi (Wireless LAN) has been described, during implementation, using another type of wireless communication which can use the aforementioned band is available in addition to the Wi-Fi method. Moreover, in an exemplary embodiment, although using a 5 Ghz band has been explained, another band near 5 Ghz can alternatively be used.

The communication interface 210 transmits a control command by using a wireless communication method. To be specific, the communication interface 210 may transmit a user control command received through the user interface 230, which will be described later, to the communication interface 110 of the host apparatus 100.

The communication interface 210 transceives control data with the host apparatus 100 by using a wireless communication method. Herein, the control data is data transmitted between the host apparatus 100 and the display apparatus 200, excluding image data and voice data, which may include a user control command received from a user on the display apparatus 200 or the host apparatus 100, an apparatus control command corresponding to the received control command, information on a state of the host apparatus, and information on a state of the display apparatus, or the like. Accordingly, the communication interface 210 may transceive state information of the host apparatus 100 and state information of the display apparatus 200 with the communication interface 110 of the host apparatus 100 by using a wireless communication method. Herein, the state information may be information regarding an operation mode of the host apparatus 100 and the display apparatus 200, or the power state of a display apparatus (i.e., information regarding remaining battery charge level). Meanwhile, in this exemplary embodiment, although it has been described that a control data is transmitted by using a wireless communication method which transmits image data, during implementation, another communication method may alternatively be used (for example, Bluetooth, IR communication, etc.)

The communication interface 210 transmits photographing data to the host apparatus 100. To be specific, the communication interface 210 may transmit to the host apparatus 100 photographing data generated at the photographing unit 240, which will be described later, by using the wireless communication method. Meanwhile, in an exemplary embodiment, although it has been described that photographing data is transmitted by using a wireless communication method, during implementation, photographing data may be transmitted to the host apparatus 100 through a communication method (for example, Bluetooth, RF communication, IR communication, etc.) other than the wireless communication method.

The communication interface 210 detects a wireless connection state with the host apparatus 100. To be specific, the communication interface 210 may detect whether a wireless connection state with the host apparatus 100 is a preset first state or a preset second state. Herein, the preset first state indicates a wireless connection state in which a wireless connection with the host apparatus 100 is broken, or which is not strong enough to receive and display an image at the display apparatus 200 even though a wireless connection state with the host apparatus 100 is not broken. The preset second state indicates a wireless connection state with the host apparatus 100, which may display an image with enough connection and/or low delay at the host apparatus 100, even though there is a slight delay. That is, the aforementioned state may indicate a wireless connection state between the two apparatuses, and may also indicate a wireless connection intensity (for example, SNR (signal to Noise Ratio)). Such first preset state and the second preset state may be set or changed by the initial system setting value or by a user setting. Meanwhile, in this exemplary embodiment, although it has been explained that the communication interface 210 detects a wireless connection state with the host apparatus 100, during implementation, additional components of the display apparatus 200 may detect a wireless connection with the host apparatus 100. In addition, during implementation, a wireless connection state may be detected in additional consideration of buffering while displaying an image, etc.

The communication interface 210 may be connected to an internet network by using a wireless communication method. To be specific, when a display mode of the display apparatus 200 is the second display mode, the communication interface 210 may be connected to the internet network by using a wireless communication method. Herein, the wireless communication method may be the wireless communication method which is the same as the wireless communication method used to connect with the host apparatus 100, or may be different from the wireless communication method used to connect with the host apparatus 100.

The decoder 220 performs hardware decoding of the received image data. To be specific, by performing decoding of the received data by the decoding method corresponding to the encoding method of the host apparatus 100, the decoder 220 may output data of an HDMI method. Herein, for decoding, the standard H.264 type can be used, or other than the H.264 method, another decoding method may alternatively be used. Meanwhile, in this exemplary embodiment, although it has been described that decoding is performed by using a separate decoder 220, that is, hardware decoding is performed, during implementation, the controller 260 can perform the decoding without an additional hardware decoder (that is, software decoding).

The user interface 230 may have a plurality of function keys which enable a user to set or select various functions supported by the display apparatus 200, and display various information provided by the display apparatus 200. The user interface 230 may be implemented as a touch screen which implements input and output at the same time, or as a combination of an input apparatus such as a button and a display apparatus which displays an image. However, it is desirable that the user interface 230 of the display apparatus 200 is implemented as a touch screen of the user interface 230, which provides both the ability of a user to input commands via a touch on a screen as well as view image data being output on the screen.

The user interface 230 displays the received first image data. To be specific, the user interface 230, when a display mode of the display apparatus is the first display mode, the user interface 230 may display image data received through the communication interface 210. Meanwhile, when receiving data where image data and voice data is combined through the communication interface 210, that is, when receiving visual streaming data, the user interface 230 may separate the received visual streaming data into a image streaming data and voice streaming data, display an image corresponding to the separated image streaming data, and output voice corresponding to the separated voice streaming data. Such image streaming data and voice streaming data may be data according to a single content, and may be data according to a plurality of contents. That is, image streaming data can be a resultant object of an application program related to internet surfing, and voice streaming data can be a resultant object of an application program related to reproducing of a sound source data.

Moreover, the user interface 230 displays the second image data generated by the controller 260 which will be described later. To be specific, when a display mode of the display apparatus 200 is the second display mode, the user interface 230 may display the second image data generated by the operations of the operating system of the display apparatus 200. In this case, while displaying the second image data, the user interface 230 may also display image data received at the host apparatus 100, together. That is, when a display mode of the display apparatus 200 is a third display mode, the user interface 230 may display the first image data and the second image data together. In this case, the first image data and the second data may be displayed in a ratio of 1:1, or the first image data can displayed on a main screen while the second image data is displayed on a sub screen in PIP type, or vice versa, etc.

In addition, the user interface 230 displays state information of the host apparatus 100. To be specific, when state information notifying a user that an operation mode of the host apparatus 100 is changed through the communication interface 210 is received at the display apparatus 200, the user interface 230 may display that an operation mode of the host apparatus 100 is changed. In this case, the user interface 230 may display a change of an operation mode of the display apparatus 200 according to the received notification of the change of an operation mode of the host apparatus 100.

In addition, the user interface 230 displays a state of a battery. To be specific, the user interface 230 may display state information on a battery (for example, whether a battery is being charged, a battery is not being charged, remaining battery charge level, information that charging is required, if the remaining battery charge level is less than a preset remaining battery charge level, or the like).

In addition, the user interface 230 displays a wireless connection state with a host apparatus. To be specific, when a wireless connection state with a host apparatus is a preset first condition, that is, when the connection state is a state where image data transmitted from the host apparatus 100 cannot be displayed, the user interface 230 may display that a change of an operation mode is required. On the other hand, while displaying an image by its own operating system, when image data transmitted from the host apparatus 100 can be displayed, the user interface 230 may display that an operation mode can be changed.

In addition, the user interface 230 receives a selection of a display mode of the display apparatus 200. To be specific, the user interface 230 may have a physical button or a software button, and may receive a selection from a user regarding an image to be displayed from among the first image data (image data received from the host apparatus 100) and/or the second image data (image data generated by the display apparatus 200). This selection operation may be executed at a time when a user desires, and also may be executed at a time when a wireless connection state with a host apparatus is changed, as described above.

The user interface 230 may include various sensors, and can handle data input from each sensor as a control command.

The photographing unit 240 photographs a subject for photography and generates photographing data. To be specific, the photographing unit 240 may include a lens which gathers light of a subject and forms an optical image on a photographing area, an imaging device which electronically converts light input through a lens to an electric signal, and an AD converter which converts an analog signal of an imaging device into a digital signal, and outputs the signal. In this case, the imaging device maybe a CCD (Charge Coupled Device) or a CMOS (Complementary Metal Oxide Semiconductor). Meanwhile, in an exemplary embodiment, although generating photographing data including an image only has been described, during implementation, the photographing unit 240 may include a microphone, and may generate photographing data including voice data generated from a microphone.

The battery 250 supplies power for each configuration within the display apparatus 200. To be specific the battery 250 may include a battery which stores power and a detector which detects a state of the battery. In addition, the battery 250, according to a control of the controller 260 to be explained later, may enable power supply according to an operation mode of the display apparatus 200. Meanwhile, the battery 250 may be charged with a wireless charge method.

The controller 260 performs a control on each component of the display apparatus 200. To be specific, the controller 260 determines an operation mode of the display apparatus 200. More specifically, where there is no user input for a preset period of time, or a user does not perform works for a preset period of time, the controller 260 may determine an operation mode of the display apparatus 200 as a power saving mode. In addition, when receiving state information notifying a user that an operation mode of the host apparatus 100 is changed to a power saving mode through the communication interface 210, the controller 260 may determine an operation mode of the display apparatus 200 as a power saving mode.

Meanwhile, during a power saving mode, when a wake-up command is received from a user through the user interface 230, or state information notifying a user that an operation mode of the host apparatus 100 is changed from a power saving mode to a normal mode is received through the communication interface 210, the controller 260 may determine an operation mode of the display apparatus 200 as a normal mode.

In addition, the controller 260 may determine an operation mode of the display apparatus according to a state of a battery of the display apparatus 200. To be specific, when remaining battery charge level of the display apparatus 200 is less than a preset remaining battery charge level, the controller 260 may determine an operation mode of the display apparatus 200 as a power saving mode. By this determination, when an operation mode of the display apparatus 200 is changed to a power saving mode, and thereafter, when a battery of the display apparatus 200 is changed to a charging state, the controller 260 may determine an operation mode of the display apparatus 200 as a normal mode again.

Further, the controller 260 may determine a display mode according to a wireless connection state with a host apparatus. To be specific, while displaying the received first image data, when a wireless connection with a host apparatus is a preset first state (that is, connection is disconnected, or connection is not sufficient), the controller 260 may control to display the generated second image data, that is, to operate the display apparatus 200 as the second display mode. On the other hand, while displaying the generated second image data, when a wireless connection with a host apparatus is a preset second state (that is, connection state is good), the controller 260 may control to display the received first image data, that is, to operate the display apparatus 200 as the first display mode or the third display mode (i.e., display both first and second image data). Meanwhile, in the exemplary embodiment, although it has been explained that a display mode is determined according to a wireless connection state with a host apparatus, a changing wireless connection state can be indicated to a user, and a display mode can subsequently be selected by a user. Also, when the first image data is receivable, a display mode can be changed freely by the choice of a user.

In addition, the controller 260 may control each component of the display apparatus 200 to correspond to a determined operation mode. To be specific, when an operation mode of the display apparatus 200 is changed to a power saving mode, the controller 260 may control the communication interface 210 to communicate with the host apparatus 100 by using only a wireless communication method. That is, it can be controlled that the communication interface 210 does not operate separately, but instead the communication interface 210 operates only via a wireless communication from the host apparatus 100.

In addition, when an operation mode of the display apparatus 200 is changed to a normal mode, each component of the display apparatus 200 may be controlled so that the components which were inactive during a power saving mode can be woken up.

When an operation mode of the display apparatus 200 is changed, the controller 260 may control the communication interface 210 so that an operation of the changed display apparatus 200 can be transmitted to the host apparatus 100 as state information.

In addition, when image data is received through the communication interface 210, the controller 260 may control the communication interface 210, the decoder 220, and the user interface 230 to decode and display the received image data on the user interface 230.

In addition, when a user control command is received through the user interface 230, the controller 260 may control the communication interface 210 so that the input user control command can be transmitted to the host apparatus 100 as control data.

When receiving a command from the host apparatus 100 for photographing, the controller 260 may control the photographing unit 240 to generate photographing data, and may control the communication interface 210 to transmit the generated photographing data to the host apparatus 100.

In addition, when a display mode of the display apparatus 200 is the second display mode or the third display mode, the controller 260 may control the user interface 230 to generate an image to be displayed on the user interface 230 by its own operating system and display the generated image. In this case, the controller 260 has a storage device which stores a program to perform the above described operations. Detailed configurations of the controller 260 will be described later with reference to FIG. 4.

As described above, according to an exemplary embodiment, even when a wireless connection with the host apparatus 100 is weak or broken, the display apparatus 200 enables operations to be performed by using its own operating system provided in the display apparatus 200, and thus the degree and scope of utilization of the display apparatus 200 is improved.

Figure 4:
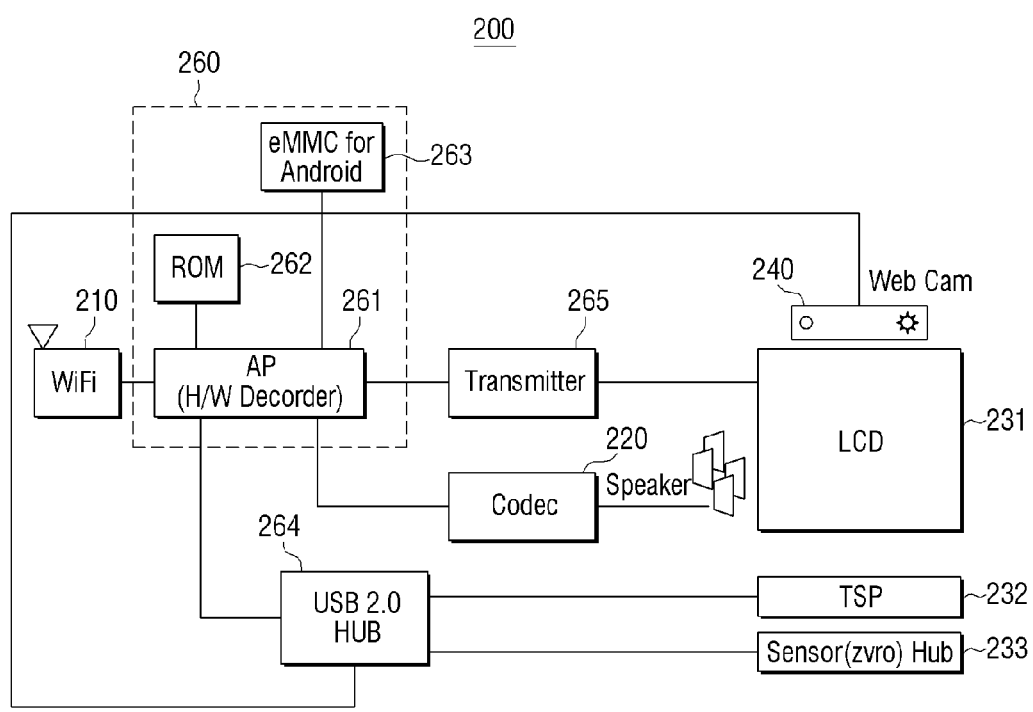
FIG. 4 is a detailed circuit diagram of the display apparatus of FIG. 3.

FIG. 4 is a detailed circuit diagram of the display apparatus of FIG. 3.

Referring to FIG. 4, the display apparatus 200 may include the communication interface 210, the decoder 220, the user interface 230, the photographing unit 240, and the controller 260.

The communication interface 210 may include an RF module, and receives data from the host apparatus 100 as a Wi-Fi method, and transmits the received data to an AP (H/W decoder) 261. Further, by using Wi-Fi a method, the communication interface 210 transmits the data to be transmitted to the host apparatus 100. Herein, the data to be transmitted can be a control operation input through the user interface 230, information measured by each sensor, and/or photographing data generated at the photographing unit 240.

The decoder 220 receives encoded voice data from the AP 261, and performs decoding on the received voice data. Meanwhile, in this exemplary embodiment, although it has been explained that the decoder 220 performs decoding of voice data, and the AP 261 performs decoding of image data, during implementation, both the image data and voice data can be decoded at one codec 220.

The user interface 230 may include a display 231 which outputs an image, a touch screen 232, a sensor 233, and a speaker.

The display 231 may receive a HDMI type data from the AP 261 through the transmitter 265, and display an image by using the received HDMI type data.

The touch screen 232 is disposed on the display 231, and a coordinate value of an area which a user touches may be transmitted to the AP 261 as a control command. In this case, the touch screen 232 may output a control command by using a USB method. Meanwhile, in the exemplary embodiment, although it has been illustrated that the display 231 and the touch screen 232 are separate configurations, during implementation, the display 231 and the touch screen 232 can be provided as one apparatus.

The sensor 233 may include a gyro sensor, or the like, to detect disposition direction and location of the display apparatus 200, and output data of the sensor as a USB method. Such output data of the sensor 233 is handled as control data, and can be transmitted to the host apparatus 100 through the communication interface 210.

The photographing unit 240 generates photographing data having an image and voice. In addition, the photographing unit 240 may transmit the generated photographing data to the AP 261 by a USB method.

The controller 260 controls each component of the display apparatus 200. To be specific, the controller 260 may include the AP 261, a ROM 262, and a flash memory 263.

The AP 261 receives encoded image data from the communication interface 210, and performs decoding on the received encoded image data. In addition, the AP 261 may output the decoded image data to the display 231 by an HDMI method.

In addition, the AP 261 may control each component of the display apparatus 200, and perform the operations of the controller 260 which have been explained with reference to FIG. 3.

In addition, the AP 261 controls the operation of the communication interface 210. To be specific, when data is received through the communication interface 210, the AP 261 determines whether the data is image data or control data, and outputs image data to an LCD 231 after decoding, and processes control data according to a pre-stored process.

In addition, the AP 261 may receive a control command and photographing data received through a touch screen by using a USB method, and may control the communication interface 210 to transmit the received control command and photographing data.

In addition, the AP 261 is driven by using the operating system stored in the ROM 262. Herein, the operating system can be the Android. Meanwhile, in an exemplary embodiment, although the Android is used as the operating system, during implementation, any other operating systems other than Android can also be used.

The ROM 262 may store a program which is a collection of various commands required to drive the display apparatus 200. Herein, the program includes not only an application program to provide a specific service, but also an operating program to drive the application program. Meanwhile, when implementing, an application program can be stored in a flash memory 263.

FIGS. 5-10 are views provided to explain the operations of an electronic system according to exemplary embodiments of the present inventive concept.

Figure 5:
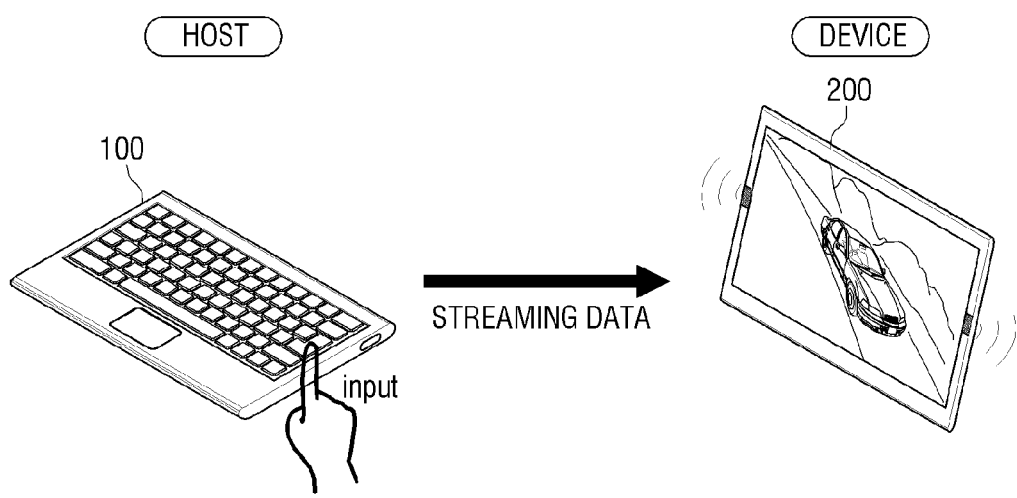
FIGS. 5-10 are views provided to explain the operations of an electronic system according to an exemplary embodiment.

Referring to FIG. 5, when a user inputs a control command through the user interface 120 of the host apparatus 100, the host apparatus 100 may generate image data corresponding to the control command, encode the generated image data, and transmit the encoded image data to the display apparatus 200 by using a wireless communication method having a 5 Ghz band. The image data delivered by this process may be real-time streaming data which includes voice data as illustrated. As such, image data is transmitted by using a wireless communication method of a band of 5 Ghz, and thus the host apparatus 100 and the display apparatus 200 can communicate with each other if they are separated from each other by more than 30 m, and the host apparatus 100 and display apparatus 200 can also communicate when there is a wall disposed between them. In addition, image data is encoded and transmitted, and thus high quality image data can be transmitted by using low amounts of wireless resources.

The display apparatus 200 receives image data transmitted by using the aforementioned method, and performs decoding of the received image data. In addition, the display apparatus 200 may display the decoded image data on a screen and output voice data as sound.

Figure 6:
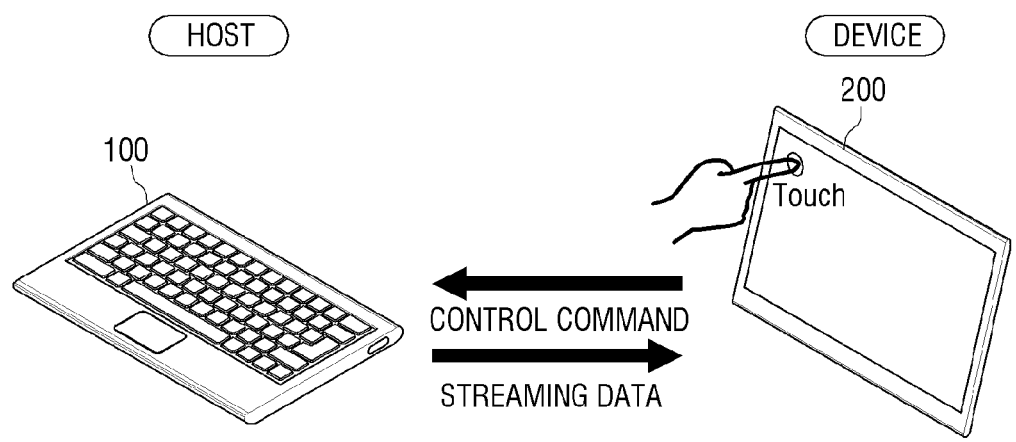

In this process, when a user inputs a touch on a touch screen of the display apparatus 200, for example, when a user inputs a command to stop while a movie is being reproduced, as illustrated in FIG. 6, the display apparatus 200 may transmit a control command received by using a wireless communication method to the host apparatus 100 through a wireless communication method. Transmitting such a control command may be performed while receiving the aforementioned image data.

The host apparatus 100 which receives such a control command from the display apparatus 200 may perform operations according to the received control command. To be specific, as a command to temporary stop is input by a user, the host apparatus 100 may generate a stopped movie scene at a point of time of receiving the control command as image data, and may perform encoding and transmitting of the generated image data.

Meanwhile, if a user's control command is a command regarding video chatting, the display apparatus 200 transmits the received control command to the host apparatus 100 by using a wireless communication method. The host apparatus 100 which receives this control command transmits control data to operate the photographing unit 240 of the display apparatus 200 to the display apparatus 200.

Accordingly, the photographing unit 240 of the display apparatus 200 then performs photographing operations, and transmits the generated photographing data to the host apparatus 100 by using a wireless communication method. The host apparatus 100 which receives the photographing data generates image data including the received photographing data and transmits the encoded image data by repeating the aforementioned operations to the display apparatus 200.

Through this process, the display apparatus 200 is able to display an image received from an external apparatus and an image photographed by a photographing unit on one screen.

Figure 7:
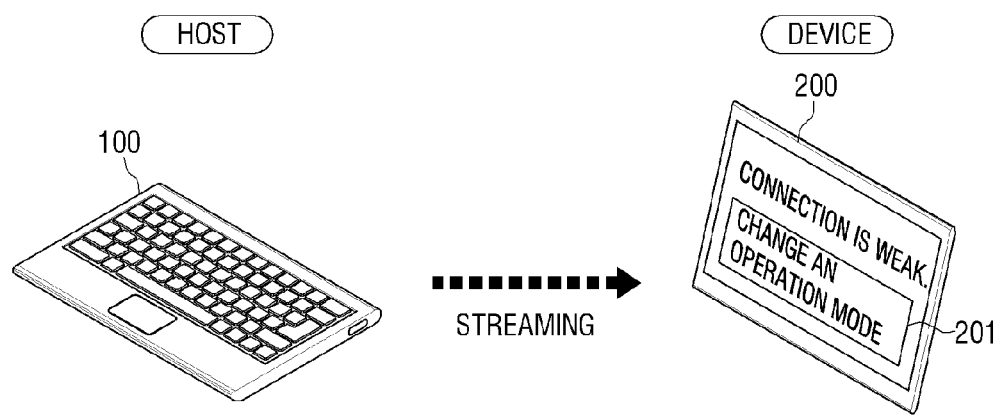

Meanwhile, among the aforementioned operations, when the display apparatus 200 moves and a wireless connection state with the host apparatus 100 becomes weak or is disconnected, as illustrated in FIG. 7, the display apparatus 200 may determine that an image transmitted from the host apparatus 100 cannot be displayed, and can display for a user a notification that changing of a display mode is required. For example, while using a display apparatus as a detachable apparatus, a user transports the display apparatus outside of the user's home or outside of the wireless connection range, the display apparatus may detect that a wireless signal has become weak, and can request from a user whether to power off automatically through a pop-up menu or to convert to the Android mode of operation.

Figure 8:
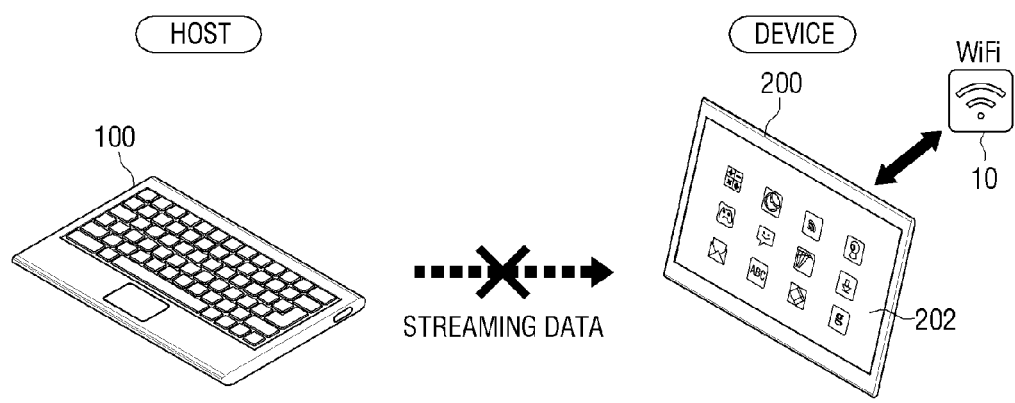

When a user changes a display mode, as illustrated in FIG. 8, the display apparatus 200 may display image data 202 generated by its own operating system. In this case, the display apparatus 200 may be directly connected to the internet network 10 by using a wireless communication method.

Figure 9:
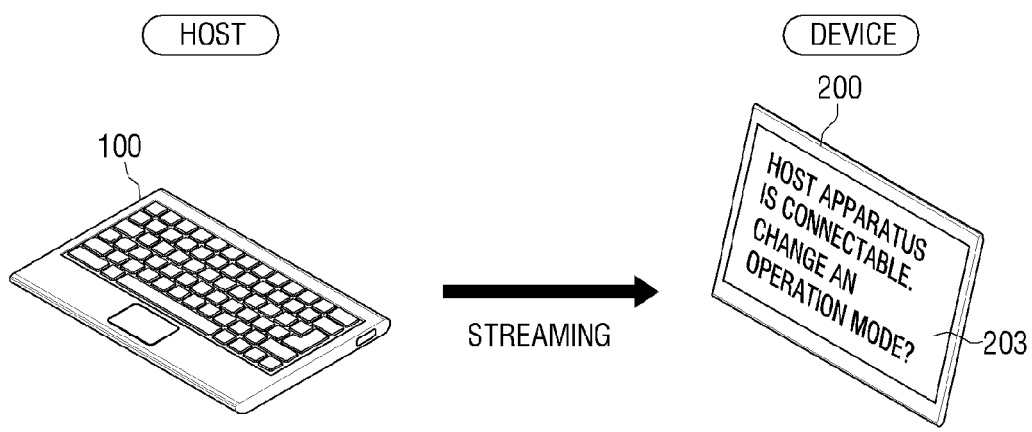

Meanwhile, while the display apparatus 200 is being operated in the second display mode, when a wireless connection with the host apparatus 100 is restored or becomes the preset second state, as illustrated in FIG. 9, the display apparatus 200 may determine that an image transmitted from the host apparatus 100 can be displayed, and can display a notification that changing of a display mode is available to a user.

Figure 10:
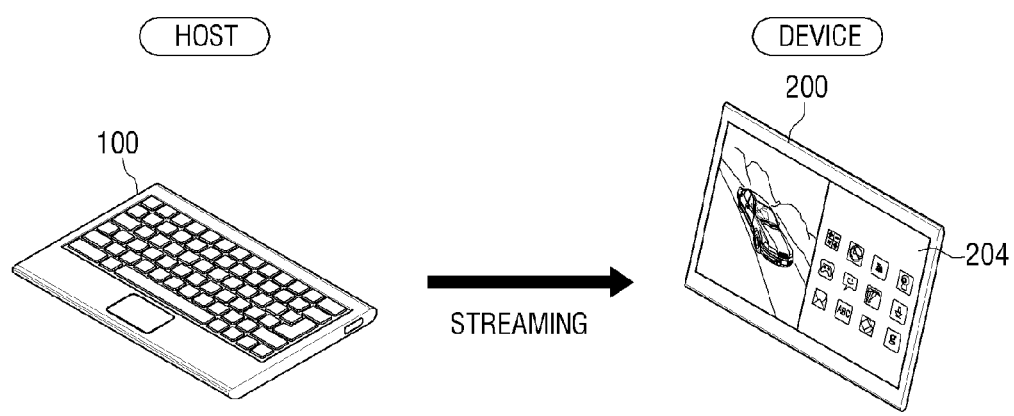

When a user changes a display mode, a screen as described in FIG. 5 or FIG. 6 may be displayed. Meanwhile, when a user selects the third display mode instead of the first display mode, the display apparatus 200, as illustrated in FIG. 10, may display the first image data received from the host apparatus 100 and the second display data generated by the apparatus, together.

Figure 11:
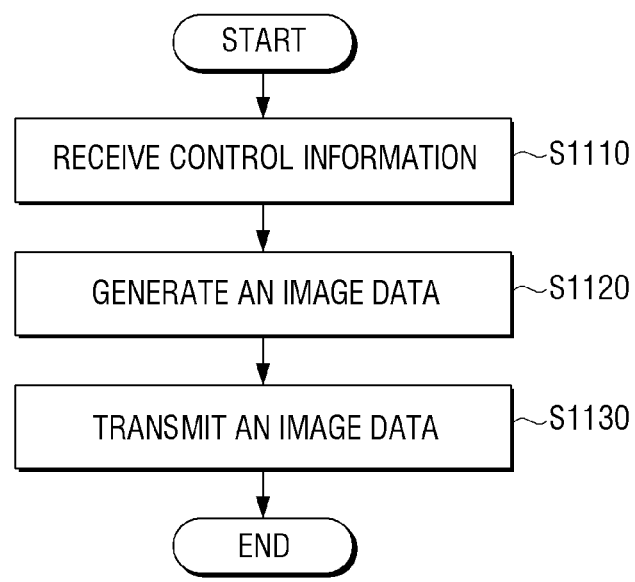
FIG. 11 is a flow chart provided to explain the control operations of a host apparatus according to an exemplary embodiment.

FIG. 11 is a flow chart provided to explain the control operations of a host apparatus according to an exemplary embodiment.

Referring to FIG. 11, a control information received through a touch screen of the display apparatus 200 is received (operation S1110). Meanwhile, when implementing, a control command may be directly received through the user interface 120 provided in the host apparatus 100.

In addition, image data corresponding to the received control command is generated (operation S1120). To be specific, the host apparatus 100 may generate image data to be displayed on the display apparatus 200 as real-time streaming data. In this case, the host apparatus 100 may generate streaming data including voice data. Such streaming data can be HDMI (High-Definition Multimedia Interface) type data.

In this case, encoding can be performed for the generated image data. To be specific, by using an encoder which performs hardware encoding independently without control of a controller of a host apparatus, the hardware encoding of the generated image data may be performed. Herein, the encoding may use the standard H.264 method, or another encoding method other than the standard H.264 method which may handle image quality degradation or may process enough bandwidth may be used.

Furthermore, the generated image data is transmitted to a display apparatus by using a wireless communication method which uses a preset band (operation S1130). To be specific, by using 802.11n (bandwidth 300 Mbps) or 802.11ac (bandwidth 1 Gbs) which has a 5 GHz band having enough usable distance for home use, hardware encoded image data can be transmitted to the display apparatus 200. Meanwhile, in the exemplary embodiment, although it has been explained that the Wi-Fi (Wireless LAN) method is used, during implementation, wireless communication types other than the Wi-Fi method can be used. Also, although the exemplary embodiment explains that band of 5 Ghz is used, another band near 5 Ghz can also be used.

Therefore, a method of controlling of a host apparatus according to exemplary embodiments encodes image data and transmits the encoded image data to the display apparatus 200, and thus, even with low wireless communication availability, high resolution image data can be transmitted. In addition, image data photographed by the display apparatus 200 and as well as various control data received at the display apparatus 200 can be transmitted to the host apparatus 100 by using the same wireless communication method. In addition, image data is processed by using a hardware encoding method which is operated independently without control by a CPU, and thus image data can be transmitted to a display apparatus without latency regardless of a degree of a load on the CPU. A method of controlling a host apparatus as illustrated in FIG. 11 may be executed on a host apparatus having the configuration of FIG. 2, and also may be executed on a host apparatus having another configuration.

In addition, a method of controlling a host apparatus as described above may be implemented as a program (or application) including an executable algorithm which can be executed via a computer, and the program may be stored and provided in a non-transitory computer readable medium.

The non-transitory recordable medium refers to a medium which may store data semi-permanently rather than storing data for a short period of time such as a register, a cache, and a memory, and may be readable by an apparatus. Specifically, the above-mentioned various applications or programs may be stored in a non-temporal recordable medium such as a CD, a DVD, a hard disk, a Blu-ray disk, a USB, a memory card, and a ROM, and provided therein.

Figure 12:
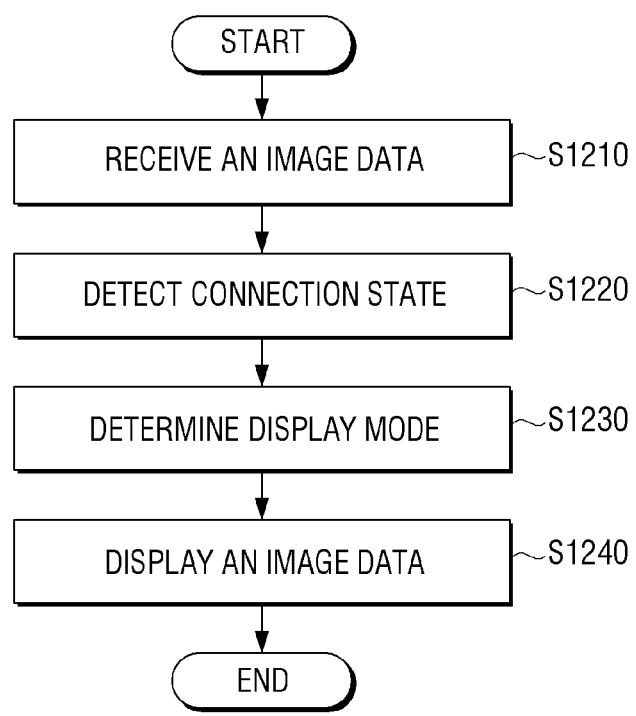
FIG. 12 is a flow chart provided to explain the control operations of a display apparatus according to an exemplary embodiment.

FIG. 12 is a flow chart provided to explain the control operations of a display apparatus according to an exemplary embodiment.

Referring to FIG. 12, first, image data is received from a host apparatus by using a wireless communication method using a preset band (operation S1210). To be specific, by using 802.11n (bandwidth 300 Mbps) or 802.11ac (bandwidth 1 Gbs) which has a 5 GHz band having enough usable distance for a user's home, the communication interface 210 may receive image data transmitted from the host apparatus 100. Meanwhile, in an exemplary embodiment, although it has been explained that the Wi-Fi (Wireless LAN) method is used, during implementation, wireless communication types other than the Wi-Fi method can be used. Also, although the exemplary embodiments explain that a band of 5 Ghz is used, another band near 5 Ghz can also be used.

At this time, when the received image data is encoded, the received image data is decoded. To be specific, by performing decoding of the data received by a decoding method corresponding to an encoding method of the host apparatus 100, data of an HDMI method can be output. Herein, for the decoding, the standard H.264 type can be used, or another decoding method other than the standard H.264 can be used. Meanwhile, if the received data is HDMI type data where image data and sound data are combined, the received data can be separated into image data and voice data, and decoding can be performed respectively for both types of data.

In addition, a wireless connection state with a host apparatus is detected (operation S1220). To be specific, it can be determined that a wireless connection state with the host apparatus is a state to change image data to be displayed on a user interface.

According to a detected wireless connection state or by a user selection, a display mode of a display apparatus is determined (operation S1230). To be specific, when a wireless connection with a host apparatus is a preset first state (that is, the connection is not good or connection is disconnected) in the first display mode which displays the received first image data, it can be determined to operate the second display mode to display the generated second image data (generated at the display apparatus). On the other hand, when a wireless connection with a host apparatus is a preset second state (that is, the connection state is good) in the second display mode state which displays the generated second image data, it can be determined to operate as the first display mode, to display the received first image data. This determination can be made while a user checks the process.

If the determined display mode is the second display mode or the third display mode, the second image data is generated by the operations of the operating system of the display apparatus 200.

In addition, at least one of the generated second image data and the received first image data is displayed by using a touch screen (operation S1240). Meanwhile, if the received data is combined data of image data and voice data, that is, if receiving a visual streaming data at the display apparatus 200, decoded voice data can be output by using a speaker at the same time as displaying the decoded image data.

Meanwhile, while operating as the first display mode, if a control command is input through a touch screen of the display apparatus 200, control information corresponding to the received control command may be transmitted to the host apparatus 100. Meanwhile, while operating as the second display mode, a control command received through the touch screen can be handled by the display apparatus without any control commands being transmitted to the host apparatus 100.

As described above, according to an exemplary embodiment, even when a wireless connection with the host apparatus 100 is weak or broken, the display apparatus 200 enables operations by using its own operating system in the display apparatus 200, and thus a degree and scope of utilization of the display apparatus 200 is improved. A method of controlling a display apparatus as illustrated in FIG. 12 may be executed on a display apparatus having the configuration of FIG. 3 or FIG. 4, or on a display apparatus having other configurations.

In addition, a method of controlling a display apparatus as described above may be implemented as a program (or application) including an executable algorithm which can be executed via a computer, and the program may be stored and provided in a non-transitory computer readable medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus wirelessly connectable with a host apparatus, the display apparatus comprising:
   a communication interface configured to wirelessly receive first image data, generated by the host apparatus, from the host apparatus;
   a user interface configured to display image data; and
   a controller configured to control the user interface to generate, by the display apparatus, second image data, that is not based on image data received by the display apparatus from the host apparatus, by operations of an operating system of the display apparatus,
   wherein the communication interface is further configured to detect a state of a wireless connection with the host apparatus as being in a connected state or a disconnected state, and
   wherein the controller, according to the detected state of the wireless connection with the host apparatus, controls the user interface to display at least one of the second image data generated by the display apparatus and the received first image data generated by the host apparatus.

2. The apparatus as claimed in claim 1, wherein:
while the received first image data is being displayed, when the state of the wireless connection with the host apparatus is in the disconnected state, the controller controls the user interface to display the generated second image data, and
while the second image data is being displayed, when the state of the wireless connection with the host apparatus is in the connected state, the controller controls the user interface to display the received first image data.

3. The apparatus as claimed in claim 1, wherein when the wireless connection with the host apparatus is in the connected state, the user interface is further configured to receive a selection of image data to be displayed on the user interface by a user.

4. The apparatus as claimed in claim 3, wherein the controller controls the user interface to display the generated second image data or the received first image data according to the received selection by the user.

5. The apparatus as claimed in claim 1, wherein when the wireless connection with the host apparatus is in the connected state, the controller controls the user interface to display the received first image data and the generated second image data together.

6. The apparatus as claimed in claim 1, wherein the communication interface receives the first image data and voice data corresponding to the first image data, and
wherein the user interface outputs the voice data at the same time with displaying the first image data.

7. The apparatus as claimed in claim 1, wherein the received first image data is encoded image data,
wherein the display apparatus further comprises a decoder which performs hardware decoding of the received first image data, and
wherein the user interface displays the hardware-decoded first image data.

8. The apparatus as claimed in claim 1, wherein the wireless communication method is 802.11n or 802.11ac which uses a 5 Ghz band.

9. A method of controlling a display apparatus wirelessly connectable with a host apparatus, the method comprising:
wirelessly receiving first image data, generated by the host apparatus, from the host apparatus;
generating, by the display apparatus, second image data, that is not based on image data received by the display apparatus from the host apparatus, by operations of an operating system of the display apparatus;
detecting a state of a wireless connection with the host apparatus as being in a connected state or a disconnected state; and
displaying at least one of the second image data generated by the display apparatus and the received first image data generated by the host apparatus according to the detected state of the wireless connection with the host apparatus.

10. The method as claimed in claim 9, wherein the displaying comprises:
while the received first image data is being displayed, when the state of the wireless connection with the host apparatus is in the disconnected state, displaying the generated second image data, and
while the second image data is being displayed, when the state of wireless connection with the host apparatus is in the connected state, displaying the received first image data.

11. The method as claimed in claim 9, further comprising:
when the wireless connection with the host apparatus is in the connected state, receiving a selection of image data to be displayed on the user interface by a user.

12. The method as claimed in claim 9, wherein the displaying comprises:
when the wireless connection state with the host apparatus is in the connected state, displaying the received first image data and the generated second image data together.

13. The method as claimed in claim 9, further comprising:
when the wireless connection with the host apparatus is in the connected state, receiving a selection of an image data to be displayed on the user interface of the display apparatus;
wherein the displaying comprises displaying the generated second image data or the received first image data according to the received user selection.

14. The method as claimed in claim 9, wherein the receiving comprises receiving the first image data and voice data corresponding to the first image data,
wherein the displaying comprises outputting the voice data at the same time as displaying the received first image data.

15. The method as claimed in claim 9, wherein the received first image data is encoded image data,
wherein the control method further comprises hardware decoding of the received first image data; and
the displaying comprises displaying the hardware decoded first image data.

16. The method as claimed in claim 9, wherein the wireless communication method is 802.11n or 802.11ac which uses a 5 Ghz band.

* * * * *